US008418818B2

(12) United States Patent
Ono et al.

(10) Patent No.: US 8,418,818 B2
(45) Date of Patent: Apr. 16, 2013

(54) FRICTION MATERIAL COMPOSITION AND FRICTION MATERIAL THEREFROM

(75) Inventors: Manabu Ono, Hitachi (JP); Teruyuki Nagayoshi, Hitachi (JP); Mitsuhiro Inoue, Tokyo (JP); Takenori Abe, Hachioji (JP)

(73) Assignees: Hitachi Chemical Co., Ltd., Tokyo (JP); Japan Brake Industrial Co., Ltd., Tokyo (JP)

( * ) Notice: Subject to any disclaimer, the term of this patent is extended or adjusted under 35 U.S.C. 154(b) by 799 days.

(21) Appl. No.: 10/544,706

(22) PCT Filed: Feb. 5, 2004

(86) PCT No.: PCT/JP2004/001162
§ 371 (c)(1), (2), (4) Date: Aug. 5, 2005

(87) PCT Pub. No.: WO2004/069954
PCT Pub. Date: Aug. 19, 2004

(65) Prior Publication Data
US 2006/0162259 A1  Jul. 27, 2006

(30) Foreign Application Priority Data
Feb. 5, 2003 (JP) .................. 2003-027713

(51) Int. Cl.
*F16D 69/00* (2006.01)
*F16D 65/00* (2006.01)

(52) U.S. Cl.
USPC .................. 188/251 A; 188/251 R

(58) Field of Classification Search ............. 188/251 A, 188/251 R, 250 B; 523/149, 152, 155, 156; 51/298, 309
See application file for complete search history.

(56) References Cited

U.S. PATENT DOCUMENTS

| 2,483,130 | A | * | 9/1949 | Garrison ................. 502/231 |
| 3,766,180 | A | * | 10/1973 | Johnson ................ 544/134 |
| 3,953,563 | A | | 4/1976 | Kihlstedt et al. |
| 3,986,585 | A | * | 10/1976 | Toplis et al. ............ 188/73.1 |
| 5,100,950 | A | * | 3/1992 | Carlson et al. ............ 524/490 |
| 5,204,302 | A | * | 4/1993 | Gorynin et al. ............ 502/2 |
| 5,643,683 | A | * | 7/1997 | Tanaka et al. ............ 428/551 |
| 5,846,512 | A | | 12/1998 | Rendall et al. |
| 6,150,288 | A | * | 11/2000 | Suzuki et al. ............ 501/105 |
| 6,201,085 | B1 | * | 3/2001 | Matsukura et al. ....... 526/247 |
| 6,308,807 | B1 | * | 10/2001 | Matsumoto et al. ...... 188/72.4 |
| 6,355,601 | B1 | * | 3/2002 | Takenaka et al. ......... 508/108 |
| 6,447,917 | B2 | * | 9/2002 | Ogata et al. ............ 428/421 |
| 6,451,872 | B1 | * | 9/2002 | Yamane ............... 523/156 |
| 6,617,375 | B2 | * | 9/2003 | Kobayashi et al. ....... 523/156 |
| 6,863,968 | B2 | * | 3/2005 | Nagata et al. ............ 428/292.1 |
| 7,163,963 | B2 | | 1/2007 | Fraenkel |
| 7,306,665 | B2 | * | 12/2007 | Nagayoshi et al. ........ 106/36 |
| 7,338,987 | B2 | * | 3/2008 | Ono et al. ............ 523/149 |
| 2002/0051878 | A1 | * | 5/2002 | Lussier et al. ........... 428/325 |
| 2004/0221515 | A1 | * | 11/2004 | McArdle et al. ......... 51/308 |

FOREIGN PATENT DOCUMENTS

| JP | 8-104761 | 4/1996 |
| JP | 2000-234086 | 8/2000 |
| JP | 2000-256650 | 9/2000 |
| JP | 2003-13043 | 1/2003 |
| WO | WO 01/98682 A2 | 12/2001 |

OTHER PUBLICATIONS

Machine translation of JP-2003-013043.*
Translation of the International Preliminary Report on Patentability, for International Application No. PCT/JP2004/001162, mailed Feb. 23, 2006.
Japanese Official Action dated Mar. 2, 2010, in Application No. 2005-504864.
Fuji Technosystems, "Porous Absorbent Handbook", issued on Jul. 23, 2005.
Britannica Online Encyclopedia (www.britannica.com), definition of "activated alumina".
Sasol catalog, "Puralox/Catalox High purity activated aluminas", 9 pp. (Jan. 2003).

* cited by examiner

*Primary Examiner* — Melody Burch
(74) *Attorney, Agent, or Firm* — Antonelli, Terry, Stout & Kraus, LLP.

(57) ABSTRACT

The present invention is to provide a friction material composition comprising a fibrous material except for asbestos, an inorganic friction regulating agent, an organic friction regulating agent and a binder, wherein active alumina is contained as the inorganic friction regulating agent, and a fluorine series polymer is contained as the organic friction regulating agent, and to provide a friction material using the friction material composition.

19 Claims, No Drawings

FRICTION MATERIAL COMPOSITION AND FRICTION MATERIAL THEREFROM

TECHNICAL FIELD

This invention relates to the friction material using the friction material composition and friction material composition suitable for friction material, such as a disk brake pad used for braking of a car, railroad vehicles, various industrial machines, etc., and brake lining.

BACKGROUND ART

Friction material, such as a disk brake pad and brake lining, is used for a car, railroad vehicles, and various industrial machines for the braking.

Friction materials currently used, such as disk brake pad, mainly comprise a Non-Asbestos-Organic (hereinafter abbreviated to as "NAO material") series disk brake pad using fibrous material such as Aramid fiber, mineral fiber, etc., and a friction regulating agent such as cashew dust, carbon black, etc., which causes less squeal noise or abnormal sound at the time of braking (see Japanese Unexamined Patent Publication No. Hei. 6-184525, pages 1 to 3).

However, characteristics required for the brake tend to be heightened more and more in recent years, and improvement in effectiveness of brake is particularly required for the conventional NAO materials. According to the conventional disk brake pad as mentioned above, however, heat resistance is insufficient and there are defects that effectiveness of brake is likely lowered (including fade phenomenon) under high load, high speed, high temperature, etc.

The present invention is to provide a friction material composition which is suitable for a friction material, which shows less lowering in effectiveness of brake under high load, high speed, high temperature, etc., and controlling abrupt increase in friction coefficient at initial brake after allowing an automobile to stand for a period of time.

Also, the present invention is to provide a friction material, which is less lowering in effectiveness of brake under high load, high speed, high temperature, etc., and controlled in abrupt increase of friction coefficient at initial brake after allowing an automobile to stand for a period of time.

DISCLOSURE OF THE INVENTION

The present invention relates to a friction material composition comprising a fibrous material except for asbestos, an inorganic friction regulating agent, an organic friction regulating agent and a binder, wherein active alumina is contained as the inorganic friction regulating agent, and a fluorine series polymer is contained as the organic friction regulating agent.

Also, the present invention relates to the above-mentioned friction material composition wherein the active alumina is active alumina having a specific surface area calculated by the BET method (the BET method is a widely used technique for the calculation of specific surface area using adsorption, named after the authors of the theory Stephen Brunauer, P. H. Emmet and Edward Teller; "BET" consists of the first initials of their family names) of 150 m$^2$/g or more.

Also, the present invention relates to the above-mentioned friction material composition wherein the active alumina is γ-alumina.

Also, the present invention relates to the above-mentioned friction material composition wherein a content of the active alumina is 1 to 15% by weight based on the whole composition.

Also, the present invention relates to the above-mentioned friction material composition wherein a content of the active alumina is 3 to 13% by weight based on the whole composition.

Also, the present invention relates to the above-mentioned friction material composition wherein a content of the active alumina is 5 to 11% by weight based on the whole composition.

Also, the present invention relates to the above-mentioned friction material composition wherein the fluorine series polymer is powder of a polytetrafluoro-ethylene (hereinafter abbreviated to as "PTFE").

Also, the present invention relates to the above-mentioned friction material composition wherein a content of the fluorine series polymer is 0.3 to 6% by weight based on the whole composition.

Also, the present invention relates to the above-mentioned friction material composition wherein a content of the fluorine series polymer is 1 to 5% by weight based on the whole composition.

Also, the present invention relates to the above-mentioned friction material composition wherein a content of the fluorine series polymer is 2 to 4% by weight based on the whole composition.

Also, the present invention relates to a friction material which comprises a molded product of the above-mentioned friction material composition under heating and pressure.

Moreover, the present invention relates to a friction material using the above-mentioned friction material composition comprising a fibrous material except for asbestos, the inorganic friction regulating agent, the organic friction regulating agent and the binder, wherein active alumina is contained as the inorganic friction regulating agent, and a fluorine series polymer is contained as the organic friction regulating agent, and the composition shows the characteristics when a dynamo test is carried out by an automobile brake device dynamo meter test method according to JASO C406-87, then, a braking test is carried out under high speed and high decelerating conditions (180 km/h, 0.6G), and after allowing to stand at room temperature for 2 hours, a braking test is further carried out under low speed conditions (20 km/h, 0.2G) using a brake unit of an FF (front engine and front drive) automobile (displacement of 1800 to 2500 cc class), a wear amount of a disk brake pad is 2.0 mm or less, and a wear amount of a disc rotor is in the range of 50 μm or less.

BEST MODE FOR CARRYING OUT THE INVENTION

The friction material composition of the present invention comprises a friction material composition containing a fibrous material except for asbestos, an inorganic friction regulating agent, an organic friction regulating agent and a binder, wherein active alumina is contained as the inorganic friction regulating agent, and a fluorine series polymer is contained as the organic friction regulating agent. A content of the above-mentioned active alumina is preferably in the range of 1 to 15% by weight, more preferably 3 to 13% by weight, further preferably 5 to 11% by weight based on the whole composition. If the content of the active alumina is less than 1% by weight, effectiveness of brake tends to be lowered under high load, high speed, high temperature, etc., while if it exceeds 15% by weight, attackability or aggresivity to a pair material (disc rotor), or a wear amount of the disc rotor, tends to be significant. The active alumina is preferably used as powder. Also, a content of the above-mentioned fluorine series polymer is preferably in the range of 0.3 to 6% by weight, more preferably 1 to 5% by weight, further preferably 2 to 4% by weight. If the content of the fluorine series polymer is less than 0.3% by weight, effectiveness of brake tends to be lowered under high load, high speed, high temperature, etc., and an effect of controlling abrupt increment of friction coefficient at an initial brake after allowing an automobile to stand tends to be insufficient. If it exceeds 6% by weight, usual effectiveness of brake tends to be lowered, and a wear amount of a disk brake pad tends to be increased. Here, the fluorine series polymer is preferably used as powder, and the same effects can be expected when it is used as an emulsion, and contained in the friction material composition by wet mixing.

Specific surface area of the active alumina contained in the friction material composition of the present invention as an inorganic friction regulating agent is made 150 m$^2$/g or more as a value calculated from the BET method, preferably 180 m$^2$/g or more, further preferably in the range of 200 to 300 m$^2$/g. If the specific surface area is less than 150 m$^2$/g, effectiveness of brake tends to be lowered under high temperature, etc. Incidentally, measurement of the specific surface area is carried out by, for example, the BET method due to adsorption of a nitrogen gas.

Active alumina to be used in the present invention may include γ-alumina, ρ-alumina, η-alumina, δ-alumina, θ-alumina, etc. Of these, γ-alumina is preferably used in the points of effectiveness of brake under high load, high speed, high temperature, etc., and in the point of attack-ability to the disc rotor. γ-Alumina can be obtained by, for example, drying aluminum hydroxide at a low temperature to obtain alumina gel, and subjecting it to calcination (activation treatment) at the temperature of 500 to 800° C. Also, the active alumina preferably has fine pores, and an average fine pore size of the above-mentioned active alumina is preferably within the range of 10 to 150 Å, more preferably in the range of 50 to 100 Å. Incidentally, measurement of the average fine pore size can be carried out by, for example, the BET method due to adsorption of a nitrogen gas.

The fluorine series polymer to be contained as the organic friction regulating agent in the friction material composition according to the present invention may include PTFE, tetrafluoroethylene-perfluoroalkylvinyl ether copolymer (PFA), tetrafluoroethylene-hexafluoropropylene copolymer (FEP), etc. Of these, powder of PTFE is preferably used in the points of effectiveness of brake, and wear amount of the disk brake pad.

A material of the friction material in the present invention can be applied to, for example, a semi-metallic series, a low steel series, a non-steel series material, etc.

Also, the friction material composition of the present invention comprises, in addition to the above-mentioned active alumina and fluorine series polymer, a fibrous material, an inorganic friction regulating agent, an organic friction regulating agent, a binder, and, if necessary, metallic powder, etc. The fibrous material may be mentioned, for example, steel fiber, copper fiber, brass fiber, phosphor bronze fiber, Aramid fiber, acrylic fiber, carbon fiber, ceramics fiber, rock wool, potassium titanate fiber, calcium carbonate whisker, magnesium carbonate whisker, etc., and they can be used alone or in combination of two kinds or more. The friction regulating agent is used for optionally adjusting a friction coefficient, wear, etc., with a rotor, and may include inorganic and organic materials. The inorganic friction regulating agent other than active alumina may include, for example, barium sulfate, calcium carbonate, magnesium carbonate, calcium oxide, calcium hydroxide, vermicurite, mica, wollastonite, α alumina, silica, zirconia, zircon, magnesia, iron oxide, iron sulfide, tin sulfide, antimony trisulfide, molybdenum disulfide, carbon black, coaks, etc., and they can be used alone or in combination of two kinds or more. The organic friction regulating agent other than the fluorine series polymer may include, for example, various kinds of rubber powder, cashew dust, etc., and they can be used alone or in combination of two kinds or more. The binder is used as an adhesive at the time of preparing a friction material by mixing it with the fibrous material, the inorganic friction regulating agent, the organic friction regulating agent and the metallic powder, etc., and may include, for example, a phenol resin, a melamine resin, an epoxy resin, and further a thermoplastic resin modified by these materials with cashew oil, silicone oil, various kinds of elastomers, etc., a thermoplastic resin in which various kinds of elastomers, fluorine polymers, etc. are dispersed, and the like, and they can be used alone or in combination of two kinds or more. Also, it is possible to use the material in combination of metallic powder such as copper powder, brass powder, zinc powder, etc., if necessary, and they can be used alone or in combination of two kinds or more.

A content of the above-mentioned fibrous material is preferably 5 to 40% by weight, more preferably 10 to 35% by weight, further preferably 15 to 30% by weight based on the whole composition in the point of mechanical strength, etc. A content of the inorganic friction regulating agent is preferably 20 to 80% by weight, more preferably 30 to 70% by weight, further preferably 40 to 60% by weight based on the whole composition depending on the characteristics. A content of the organic friction regulating agent is preferably 2 to 25% by weight, more preferably 4 to 23% by weight, further preferably 6 to 21% by weight based on the whole composition in the point of a wear amount of the pair material. A content of the binder is preferably 2 to 15% by weight, more preferably 3 to 14% by weight, further preferably 4 to 13% by weight based on the whole composition in the points of mechanical strength, wear resistance, etc. These components are so formulated that the total composition becomes 100% by weight.

The friction material according to the present invention can be obtained by, for example, uniformly mixing the materials containing the above-mentioned fibrous material, the inorganic friction regulating agent, the organic friction regulating agent and the binder, and metallic powder to be added depending on necessity, pre-molding the mixture, molding the material by the molding method under heating and pressure after inserting and providing a backing plate and pre-mold material into a mold, and then, subjecting to heat treatment, and subjecting to scorch treatment for removing the organic material on the surface thereof, if necessary.

Incidentally, the heating temperature at the time of molding under heating and pressure is preferably 130 to 170° C., more preferably 140 to 160° C. Also, the pressure at the time of molding under heating and pressure is preferably 20 to 60 MPa, more preferably 30 to 50 MPa. A temperature of the heat treatment to be carried out after molding under heating and pressure is preferably 180 to 300° C., more preferably 200 to 250° C. Also, the scorch treatment can be carried out by, for example, the method of contacting a hot plate to a friction member by pressing, the method of heating with an open fire such as flame of a gas, the method of heating with radiant heat such as far infrared rays, etc., and the like. With regard to the conditions of the scorch treatment, appropriate conditions suitable for the material are selected and the treatment is carried out.

EXAMPLE

In the following, the present invention is explained by referring to Examples.

Examples 1 to 12, Comparative examples 1 to 2

Materials shown in Table 1 and Table 2 were formulated, and mixed by a mixer with a rotation number of 3000 r/min for 4 minutes to obtain friction material compositions. Then, these friction material compositions were each pre-molded to a predetermined shape, then, a backing plate and a pre-molded material were inserted and provided in a mold, molding under heating and pressure was carried out under the conditions of 140±5° C. and 50 MPa for 10 minutes, further heat treatment was carried out at 250° C. for 5 hours, and polished after cooling to obtain respective disk brake pads.

Next, disk brake pads of Examples according to the present invention and disk brake pads of Comparative example were carried out comparative test with regard to effectiveness of brake (friction coefficient) and a wear amount of the disk brake pad and the disc rotor. The test results are shown in Table 3. Incidentally, the test conditions are as mentioned below.

(1) Effectiveness of Brake

A dynamo test was carried out by an automobile brake device dynamo meter test method according to JASO C406-87, in addition, a braking test was carried out under high speed and high decelerating conditions (180 km/h, 0.6 G), and a test machine was allowed to stand at room temperature for 2 hours after the test, a braking test was carried out under low speed conditions (20 km/h, 0.2 G) using an FF (front engine and front drive) automobile (displacement of 1800 to 2500 cc class). According to these tests, an average friction coefficient (average μ value) under the usual driving conditions (50 km/h, 0.3 G), an average friction coefficient (average μ value) under high speed and high decelerating conditions (180 km/h, 0.6 G), a minimum friction coefficient at the first time fade test and an average friction coefficient at the initial brake under low speed and low decelerating conditions (20 km/h, 0.2 G) after allowing to stand were compared to each other.

(2) Wear Amounts of Disk Brake Pad and Disc Rotor

In the above-mentioned test for effectiveness of brake, thicknesses of the disk brake pad and the disc rotor were measured before and after the test, and the wear amounts of the respective samples were calculated.

Incidentally, the above-mentioned tests were all carried out by using a brake unit for an FF (front engine and front drive) automobile (displacement of 1800 to 2500 cc class).

TABLE 1

(Unit ... % by weight)

| | Name of materials | Example 1 | Example 2 | Example 3 | Example 4 | Example 5 | Example 6 | Example 7 | Example 8 |
|---|---|---|---|---|---|---|---|---|---|
| Binder | Phenol resin, available from Hitachi Chemical Co., Ltd., trade name HP-491UP | 9 | 9 | 9 | 9 | 9 | 9 | 9 | 9 |
| Fibrous material | Aramid fiber, available from Du Pont-Toray Co., Ltd., Kevlar fiber | 4 | 4 | 4 | 4 | 4 | 4 | 4 | 4 |
| | Rock wool | 7 | 7 | 7 | 7 | 7 | 7 | 7 | 7 |
| | Copper fiber | 14 | 14 | 14 | 14 | 14 | 14 | 14 | 14 |
| Organic friction regulating agent | Cashew dust | 5 | 5 | 5 | 5 | 5 | 5 | 5 | 5 |
| | Rubber powder (NBR powder) | 3 | 3 | 3 | 3 | 3 | 3 | 3 | 3 |
| | PTFE powder, available from Sumitomo 3M Japan | 0.3 | 3 | 6 | 3 | 3 | 0.3 | 6 | 3 |
| Inorganic friction regulating agent | Antimony trisulfide | 4 | 4 | 4 | 4 | 4 | 4 | 4 | 4 |
| | Graphite, available from K.K. Graphite Works Co., Ltd., trade name: G-70 | 6 | 6 | 6 | 6 | 6 | 6 | 6 | 6 |
| | Zircon sand | 8 | 8 | 8 | 8 | 8 | 8 | 8 | 8 |
| | Barium sulfate | 24.7 | 22 | 19 | 29 | 15 | 31.7 | 12 | 22 |
| | Mica | 7 | 7 | 7 | 7 | 7 | 7 | 7 | 7 |
| | γ alumina, available from Mizusawa Industrial Chemicals Ltd., average fine pore size: 50 Å | 8 | 8 | 8 | 1 | 15 | 1 | 15 | 8 |
| Specific surface area (m$^2$/g) of γ alumina | | 180 | 180 | 180 | 180 | 180 | 180 | 180 | 150 |

TABLE 2

(Unit ... % by weight)

| | Name of materials | Comparative example 1 | Example 9 | Comparative example 2 | Example 10 | Example 11 | Example 12 |
|---|---|---|---|---|---|---|---|
| Binder | Phenol resin, available from Hitachi Chemical Co., Ltd., trade name: HP-491UP | 9 | 9 | 9 | 9 | 11 | 8 |
| Fibrous material | Aramid fiber, available from Du Pont-Toray Co., Ltd., Kevlar fiber | 4 | 4 | 4 | 4 | 3 | 3 |
| | Rock wool | 7 | 7 | 7 | 7 | 7 | 9 |
| | Copper fiber | 14 | 14 | 14 | 14 | 13 | 14 |
| Organic friction regulating agent | Cashew dust | 5 | 5 | 5 | 5 | 5 | 5 |
| | Rubber powder (NBR powder) | 3 | 3 | 3 | 3 | 3 | 3 |
| | PTFE powder, available from Sumitomo 3M Japan | 0 | 7 | 3 | 3 | 3 | 3 |
| Inorganic friction regulating agent | Antimony trisulfide | 4 | 4 | 4 | 4 | 4 | 4 |
| | Graphite, available from K.K. Graphite Works Co., Ltd., trade name: G-70 | 6 | 6 | 6 | 6 | 6 | 6 |
| | Zircon sand | 8 | 8 | 8 | 8 | 8 | 8 |
| | Barium sulfate | 25 | 18 | 30 | 14 | 22 | 22 |

TABLE 2-continued (Unit ... % by weight)

| Name of materials | Comparative example 1 | Example 9 | Comparative example 2 | Example 10 | Example 11 | Example 12 |
|---|---|---|---|---|---|---|
| Mica | 7 | 7 | 7 | 7 | 7 | 7 |
| γ alumina, available from Mizusawa Industrial Chemicals Ltd., average fine pore size: 50 Å | 8 | 8 | 0 | 16 | 8 | 8 |
| Specific surface area (m²/g) of γ alumina | 180 | 180 | 180 | 180 | 180 | 180 |

TABLE 3

| | Characteristics of effectiveness | | | | Friction characteristics | |
|---|---|---|---|---|---|---|
| | Level of usual effectiveness of brake (50 km/h, 0.3 G) (Average μ value) | Level of effectiveness of brake under high speed (180 km/h, 0.6 G) (Average μ value) | Level of effectiveness of brake under high temperature (First time fade) (Minimum value of average μ) | Level of effectiveness of brake after allowing to stand (20 km/h, 0.2 G) (Average μ value at the initial brake) | Wear amount of disk brake pad (mm) | Wear amount of disc rotor (μm) |
| Example 1 | 0.46 | 0.42 | 0.38 | 0.53 | 1.05 | 15 |
| Example 2 | 0.48 | 0.43 | 0.40 | 0.54 | 1.10 | 16 |
| Example 3 | 0.48 | 0.44 | 0.42 | 0.50 | 1.48 | 18 |
| Example 4 | 0.45 | 0.40 | 0.38 | 0.47 | 0.96 | 11 |
| Example 5 | 0.50 | 0.45 | 0.43 | 0.55 | 1.33 | 21 |
| Example 6 | 0.44 | 0.40 | 0.37 | 0.50 | 0.85 | 10 |
| Example 7 | 0.50 | 0.45 | 0.43 | 0.54 | 1.42 | 23 |
| Example 8 | 0.47 | 0.42 | 0.38 | 0.54 | 1.02 | 17 |
| Comparative example 1 | 0.46 | 0.37 | 0.34 | 0.59 | 1.02 | 14 |
| Example 9 | 0.48 | 0.44 | 0.42 | 0.49 | 1.95 | 18 |
| Comparative example 2 | 0.44 | 0.37 | 0.34 | 0.46 | 0.90 | 9 |
| Example 10 | 0.50 | 0.45 | 0.43 | 0.60 | 1.68 | 38 |
| Example 11 | 0.47 | 0.40 | 0.37 | 0.55 | 0.85 | 8 |
| Example 12 | 0.49 | 0.45 | 0.42 | 0.50 | 1.40 | 22 |

Judgment standard
In the average friction coefficient under high speed and high decelerating conditions (180 km/H, 0.6 G) and the minimum friction coefficient at the first time fade test, large number means good result.
A friction coefficient under low speed and low decelerating conditions (20 km/h, 0.2 G) after allowing to stand means better when the friction coefficient is not abruptly increased as compared to an average friction coefficient under usual conditions (50 km/h, 0.3 G).
A smaller number of wear amounts of the disk brake pad and the disc rotor mean better result.

As shown in Table 3, in the disk brake pads of Examples of the present invention, it is clear that effectivenesses of brake under high speed and high decelerating conditions (180 km/h, 0.6 G) and fade conditions are high, and friction coefficients under low speed and low decelerating conditions (20 km/h, 0.2 G) after allowing to stand are slightly increased as compared to those under usual conditions (50 km/h, 0.3 G), but increased amounts of friction coefficient are less than the disk brake pads of Comparative examples. Also, it is clear that wear amounts of the disk brake pads of Examples of the present invention and disc rotors which are pair materials thereof are also little.

To the contrary, defects are generated that in the disk brake pad of Comparative example 1, effectivenesses of brake under high speed and high decelerating conditions (180 km/h, 0.6 G) and under fade conditions are low, and increase in friction coefficient under low speed and low decelerating conditions (20 km/h, 0.2 G) after allowing to stand is large, and in the disk brake pad of Comparative example 2, effectivenesses of brake under high speed and high decelerating conditions (180 km/h, 0.6 G) and under fade conditions are low.

As described above, according to Examples mentioned above, a friction material using the friction material composition which comprises the fibrous material except for asbestos, the inorganic friction regulating agent, the organic friction regulating agent and the binder, wherein active alumina is contained as the inorganic friction regulating agent, and a fluorine series polymer is contained as the organic friction regulating agent, and the composition shows the characteristics that a wear amount of the disk brake pad is 1.48 mm or less, and a wear amount of the disc rotor is in the range of 23 μm or less after a dynamo test was carried out by an automobile brake device dynamo meter test method according to JASO C406-87, in addition, a braking test was carried out under high speed and high decelerating conditions (180 km/h, 0.6 G), and allowing to stand at room temperature for 2 hours after the test, a braking test was carried out under low speed conditions (20 km/h, 0.2 G) using an FF (front engine and front drive) automobile (displacement of 1800 to 2500 cc class) can be constituted.

INDUSTRIAL APPLICABILITY

The friction material composition of the present invention can provide a friction material which is low in effectiveness of brake under high load, high speed, high temperature, etc., and also, can control abrupt increment in friction coefficient at an initial brake after allowing an automobile to stand.

The friction materials of Examples according to the present invention show less lowering in effectiveness of brake under high load, high speed, high temperature, etc., and thus, are extremely suitable for industry.

The invention claimed is:

1. A friction material composition which comprises a fibrous material except for asbestos, an inorganic friction regulating agent, an organic friction regulating agent and a binder, wherein active alumina is contained as the inorganic friction regulating agent in an amount of 1 to 15% by weight based on the whole composition, and a fluorine series polymer is contained as the organic friction regulating agent in an amount of 0.3 to 6% by weight based on the whole composition.

2. The friction material composition according to claim 1, wherein the active alumina is active alumina having a specific surface area calculated by the BET method of 150 $m^2/g$ or more.

3. The friction material composition according to claim 1, wherein the active alumina is γ-alumina.

4. The friction material composition according to claim 1, wherein a content of the active alumina is 3 to 13% by weight based on the whole composition.

5. The friction material composition according to claim 1, wherein a content of the active alumina is 5 to 11% by weight based on the whole composition.

6. The friction material composition according to claim 1, wherein the fluorine series polymer is powder of a polytetrafluoroethylene.

7. The friction material composition according to claim 1, wherein a content of the fluorine series polymer is 1 to 5% by weight based on the whole composition.

8. The friction material composition according to claim 1, wherein a content of the fluorine series polymer is 2 to 4% by weight based on the whole composition.

9. The friction material composition according to claim 1, wherein the active alumina is γ-alumina and the fluorine series polymer is a polytetrafluoroethylene.

10. A friction material which comprises a molded product of the friction material composition according to claim 1 under heating and pressure.

11. The friction material composition according to claim 3, wherein the fluorine series polymer is powder of a polytetrafluoroethylene.

12. The friction material composition according to claim 1, wherein the fluorine series polymer is a powder of said polymer.

13. The friction material composition according to claim 3, wherein a content of the fluorine series polymer is 2 to 4% by weight based on the whole composition.

14. The friction material composition according to claim 1, consisting essentially of said fibrous material, said active alumina, said fluorine series polymer and said binder.

15. The friction material composition according to claim 1, wherein the active alumina is active alumina having a specific surface area calculated by the BET method of 180 $m^2/g$ or more.

16. The friction material composition according to claim 1, wherein the active alumina is active alumina having a specific surface area calculated by the BET method of 200 to 300 $m^2/g$ or more.

17. The friction material composition according to claim 1, wherein the active alumina has an average fine pore size within the range of 10 to 150 Å.

18. The friction material composition according to claim 1, wherein the active alumina has an average fine pore size within the range of 50 to 100 Å.

19. The friction material composition according to claim 3, wherein the γ-alumina is obtained by drying aluminum hydroxide at a low temperature so as to obtain alumina gel, and subjecting the alumina gel to calcination at a temperature of 500° to 800° C. so as to provide the γ-alumina.

* * * * *